United States Patent
Freitas Cunha et al.

(10) Patent No.: US 10,606,640 B2
(45) Date of Patent: Mar. 31, 2020

(54) RESCHEDULING HIGH PERFORMANCE COMPUTING JOBS BASED ON PERSONALIZED SANITY CHECKS AND JOB PROBLEM RESOLUTION CLASSIFICATION

(71) Applicant: International Business Machines Corporation, Armonk, NY (US)

(72) Inventors: Renato Luiz De Freitas Cunha, São Paulo (BR); Marco Aurelio Stelmar Netto, São Paulo (BR); Bruno S. Silva, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 15/853,752

(22) Filed: Dec. 23, 2017

(65) Prior Publication Data

US 2019/0196872 A1    Jun. 27, 2019

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/5027* (2013.01); *G06F 9/5066* (2013.01);
(Continued)

(58) Field of Classification Search
CPC .... G06F 9/4881; G06F 9/5027; G06F 9/5066; H04L 69/40; H04L 67/306; H04L 67/322
See application file for complete search history.

(56) References Cited

U.S. PATENT DOCUMENTS 6,393,590 B1    5/2002  Wood et al.
6,665,758 B1   12/2003  Frazier et al.
(Continued)

FOREIGN PATENT DOCUMENTS

WO   2010034608 A1   4/2010

OTHER PUBLICATIONS

Soualhia et al., "ATLAS: An Adaptive Failure-Aware Scheduler for Hadoop," Technical Report, Department of Electrical and Computer Engineering, Concordia University (Montreal, Quebec, Canada), Nov. 2015, 24 pp., http://hvg.ece.concordia.ca/Publications/TECH_REP/ATLAS_TR15.pdf.
(Continued)

*Primary Examiner* — Adam Lee
(74) *Attorney, Agent, or Firm* — Joseph Petrokaitis; Otterstedt, Wallace & Kammer, LLP

(57) ABSTRACT

A method includes: scheduling a job submitted by a user to be executed on at least a portion of a computing infrastructure; determining a level of sanity check to be performed on the job; performing the sanity check on the job while waiting for the job to be executed; when the sanity check shows that the job will not successfully execute, estimating at least one time required to repair the job such that the job will successfully execute; finding whether the estimated time to repair the job exceeds an estimated time remaining before the job is scheduled to be executed; and when the estimated time to repair the job is found to exceed the estimated time remaining before the job is scheduled to be executed, rescheduling the job such that the estimated time remaining before the job is scheduled to be executed exceeds the estimated time to repair the job.

20 Claims, 6 Drawing Sheets

(51) Int. Cl.
*G06F 9/50* (2006.01)
*H04L 29/14* (2006.01)
*G06F 21/54* (2013.01)
*G06F 11/34* (2006.01)
*G06F 21/55* (2013.01)
*H04L 29/08* (2006.01)

(52) U.S. Cl.
CPC .............. *G06F 11/34* (2013.01); *G06F 21/54* (2013.01); *G06F 21/552* (2013.01); *H04L 69/40* (2013.01); *H04L 67/306* (2013.01); *H04L 67/322* (2013.01)

(56) References Cited

U.S. PATENT DOCUMENTS

| | | | |
|---|---|---|---|
| 8,209,395 B2 | 6/2012 | Richoux | |
| 9,436,517 B2 | 9/2016 | Baek et al. | |
| 2005/0125396 A1 | 6/2005 | Liu | |
| 2010/0146057 A1 | 6/2010 | Abu-Hakima et al. | |
| 2011/0066728 A1 | 3/2011 | Gauthier et al. | |
| 2011/0231216 A1* | 9/2011 | Fyke | G06Q 10/0631 705/7.12 |
| 2012/0209735 A1 | 8/2012 | Subramanian et al. | |
| 2012/0317432 A1* | 12/2012 | Assad | G06F 1/329 713/340 |
| 2013/0139162 A1 | 5/2013 | Jackson | |
| 2013/0152047 A1 | 6/2013 | Moorthi et al. | |
| 2014/0149974 A1* | 5/2014 | Bank | G06F 8/65 717/172 |
| 2016/0378405 A1* | 12/2016 | Resch | G06F 11/1092 711/114 |
| 2017/0039498 A1* | 2/2017 | Vasgaard | G06Q 10/06313 |
| 2018/0181471 A1* | 6/2018 | Panta | G06F 11/1076 |
| 2019/0005426 A1* | 1/2019 | Fletcher | G06Q 10/06311 |

OTHER PUBLICATIONS

Soualhia et al., "ATLAS: An Adaptive Failure-Aware Scheduler for Hadoop," 2015 IEEE 34th International Performance Computing and Communications Conference (IPCCC), Dec. 2015, 8 pp, http://hvg.ece.concordia.ca/Publications/Conferences/IPCCC15.pdf.

Liu et al., "Sanity Tool: Lightweight Diagnostics for Individual User Accounts on Supercomputer Systems," 2016 Third International Workshop on HPC User Support Tools (HUST), Nov. 2016, p. 24-30.

Schroeder et al., "Understanding Failures in Petascale Computers," Journal of Physics: Conference Series, vol. 78: Scientific Discovery through Advanced Computing (SciDAC) 2007, article id. 012022, Jun. 2007, 11 pp., https://www.cs.cmu.edu/~garth/papers/jpconf7_78_012022.pdf.

* cited by examiner

RESCHEDULING HIGH PERFORMANCE COMPUTING JOBS BASED ON PERSONALIZED SANITY CHECKS AND JOB PROBLEM RESOLUTION CLASSIFICATION

BACKGROUND

The present invention relates to the electrical, electronic and computer arts, and, more particularly, to improvements in scheduling high performance computing (HPC) jobs.

In the context of HPC workloads, user jobs, after waiting long times in queues, frequently fail when executing for several reasons. Among these reasons are hardware failures, software errors, and human errors. Software and/or human errors can include a typographical error in input parameters, libraries not installed properly, and/or missing input files. Such software or human errors can contribute significantly to job failure.

It can be frustrating for a user to wait a long time in queues for her jobs to start and then fail. That user's time is wasted as she needs to verify and/or correct the errors and then wait all over again in the queue to start her job again. Other users may have difficulty planning their jobs because extra load in the cluster results in longer wait times for all users. The computing center owner incurs increases costs (e.g., energy and salary) and reduced user productivity.

Sanity checks on user jobs may avoid such errors and increase the successfully executed job throughput. However, sanity checks can be expensive in HPC environments. Thus, running sanity checks for all jobs with detailed verifications is not cost effective in HPC settings.

SUMMARY

A method for facilitating successful execution of a job submitted by a user includes: scheduling the job to be executed on at least a portion of a computing infrastructure; determining a level of sanity check to be performed on the job; performing the sanity check on the job while waiting for the job to be executed; when the sanity check shows that the job will not successfully execute, estimating at least one time required to repair the job such that the job will successfully execute; finding whether the estimated time to repair the job exceeds an estimated time remaining before the job is scheduled to be executed; and when the estimated time to repair the job is found to exceed the estimated time remaining before the job is scheduled to be executed, rescheduling the job such that the estimated time remaining before the job is scheduled to be executed exceeds the estimated time to repair the job.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Illustrative embodiments of the present invention apply cognitive computing to resource management to help users in HPC settings increase the throughput of successfully executed jobs and reduce the cost of sanity checking for running jobs. Illustrative embodiments of the present invention increase the number of successful jobs and reduce the number of failed jobs in HPC settings by running cost-effective sanity checks. Illustrative embodiments of the present invention provide job rescheduling based on estimated problem resolution times, as well as automatic sanity check capacity configuration. Illustrative embodiments of the present invention dynamically reconfigure computing capacity allocated to running sanity checks so as to decrease (e.g., minimize) the potential impact of job failures and to increase (e.g., maximize) the overall successful throughput in the system.

These and other features and advantages of the present invention will become apparent from the following detailed description of illustrative embodiments thereof, which is to be read in connection with the accompanying drawings.

DETAILED DESCRIPTION

Illustrative embodiments of the present invention apply cognitive computing to resource management to help users in HPC settings increase the throughput of successfully executed jobs and reduce the cost of sanity checking for running jobs. Illustrative embodiments of the present invention increase the number of successful jobs and reduce the number of failed jobs in HPC settings by running cost-effective sanity checks that leverage user profiles, estimates of solution time (e.g., using forum and Internet data), and estimates of the amount of time that users have to solve a problem before their jobs start execution. Illustrative embodiments of the present invention provide job rescheduling based on estimated problem resolution times, as well as automatic sanity check capacity configuration. Illustrative embodiments of the present invention dynamically reconfigure computing capacity allocated to running sanity checks so as to decrease (e.g., minimize) the potential impact of job failures and to increase (e.g., maximize) the overall successful throughput in the system.

Figure 1:
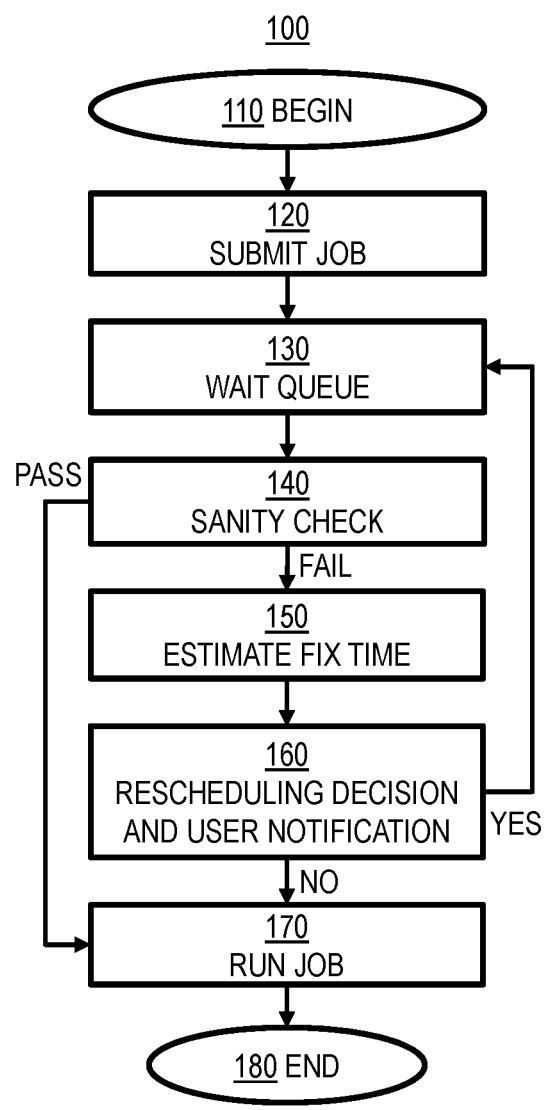
FIG. 1 is a flow chart depicting aspects of an illustrative embodiment of the invention.

FIG. 1 is a flow chart depicting aspects of an illustrative embodiment of the invention. Method 100 begins 110 when user submits a job for execution 120 on a computing infrastructure (e.g., by one or more nodes of an HPC cluster). As used herein, a "job" generally refers to one or more instructions specifying one or more applications and a set of one or more input parameters. These parameters may comprise, for example, specification(s) of how to run an application, as well as specification(s) of infrastructure resources (e.g., network, processor, memory, and storage) which impact job performance. Thus, a job submitted by a user, i.e. a user job, generally represents a user request to access infrastructure resources.

In step 130, the user job is placed in a queue to await execution. The placement of the user job in the queue (e.g., selection of a particular queue from a plurality of queues and/or position within the particular queue) may be based at least in part on one or more configurations and/or policies on how users share computing resources to achieve one or more goals (e.g., response time and/or resource utilization).

In step 140, while the user job is waiting the queue prior to being executed, a sanity check on the user job may be performed to determine whether or not the user job will successfully execute (i.e., whether or not the user job will fail when executed). The sanity check may comprise a light check and/or a heavy check. For example, a light check may be a simple verification of software dependencies and/or required libraries, while a heavy check may involve actual execution of the user job for a period sufficient to check premature failures. As another example, a light check in which the user job is started but is not run for a long time may be sufficient to detect a missing library or a typographical error in an input file, while a heavy check requiring the user job to run longer and/or uses more infrastructure resources may be necessary to detect whether the user job's memory requirements can be met by available resources (e.g., whether the memory resources required by the user job exceed memory resources available for and/or allocated to the user job).

As will discussed in further detail herein, an illustrative embodiment automatically selects a sanity check level based at least in part on, e.g., job characteristics and user profile. For example, a novice user may require heavier checks, while lighter checks may suffice for an expert user, such that sanity checks may change over time as a user becomes more experienced. Likewise, a new (e.g., recently installed, recently created, and/or recently modified) application may require heavier checks, while lighter checks may suffice for a known application.

Additionally or alternatively, an illustrative embodiment may automatically select a sanity check level based at least in part on, e.g., infrastructure resources available for and/or allocated to performing sanity checks. For example, if the infrastructure resources available for and/or allocated to sanity checks are saturated, only light checks may be executed, with heavy checks being permissible otherwise.

In turn, the infrastructure resources made available for and/or allocated to the sanity checks may be dynamically adapted based on, for example, the failure rate of job executions and/or the impact of job failure on system performance metrics (e.g., response time or resource utilization). Thus, the infrastructure resources available for and/or allocated to running sanity checks may be dynamically reconfigured so as to minimize the potential impact of job failures and/or to maximize the overall successful throughput in the system.

In some embodiments, a system administrator can manually configure the initial infrastructure resources available for and/or allocated to sanity checks, e.g., two percent of the total infrastructure resources. This initial value can then be updated using a dynamic and automated strategy. A possible strategy may be to add more resources according to the rate of failure of user jobs. For example, if only one machine is available for and/or allocated to sanity checks but half of all user jobs fail, additional machines may be made available for and/or allocated to sanity checks. Another strategy may be to verify the sanity check level being selected and, based on that, determine the amount of computing resources required for sanity checking.

As will be discussed herein with reference to step 170, if the user job passes the sanity check in step 150, it will be executed after waiting in the queue. In step 150, if the user job fails the sanity check (i.e., the sanity check indicates that the user job will fail when executed), the amount of time required to fix the failure detected by the sanity check (e.g., to solve the problem(s) causing the user job to fail such that the user job can be successfully executed) is estimated. In an illustrative embodiment, this estimated job problem resolution time may be detected based on machine learning techniques using data from the Internet, private forum data, and user expertise on solving problems. For example, historical data may be used to classify problems into different categories, and then a regression may be performed on data in these categories to predict the time to resolve problems in each category. Moreover, this step may involve determining one or more possible solutions to the problem, and estimating the time required to implement each possible solution (e.g., there may be a plurality of estimated job problem resolution times corresponding to respective possible solutions). This step may also include determining the estimated job wait time, e.g., the remaining time during which the user job will wait, prior to execution, in the queue discussed above with reference to step 130. Thus, the estimated job wait time represents an estimate of the remaining time to solve the problem before the user job begins execution.

In step 160, the user is notified of the failed sanity check. The user may also be notified about the estimated job problem resolution time (and possible solutions) discussed above with reference to step 150. The user may also be notified of the estimated job wait time, e.g., the remaining time during which her job must wait, prior to execution, in the queue discussed above with reference to step 130. The estimated wait time for this user's job may be based at least in part on the estimated run times for other jobs enqueued ahead of this user's job. Thus, the user may select and/or implement one or more of the possible solutions discussed above with reference to step 150, or the user may determine and implement a solution on her own.

If the job resolution problem time estimated in step 150 exceeds the job wait time estimated in step 150, then the user job is rescheduled so that the estimated job wait time exceeds the estimated job problem resolution time. In other words, the user job is rescheduled so that it waits in a queue for at least the time required to fix the problem, in an effort to avoid executing the job before the problem can be fixed (e.g., by the user). Optionally, a system administrator can specify an acceptable confidence level when comparing the estimated resolution time and waiting time and/or an amount of padding to be added to the estimated resolution time during rescheduling.

If rescheduling is necessary, the method returns to step 130, waiting in the queue, and after the problem is fixed (e.g., by the user), another sanity check may be performed in step 140 to ensure that the problem has been fixed and that the user job will execute successfully. Otherwise, the problem can be fixed (e.g., by the user) while the job is waiting the queue, and when its waiting time is over, is executed in step 170. Optionally, even if rescheduling is not performed in step 160, after the problem is fixed (e.g., by the user) and the user job is waiting the queue, the method may still return to step 130 so that another sanity check may be performed in step 140 to ensure that the problem has been fixed and that the user job will execute successfully in step 170. Method 100 ends in step 180.

Figure 2:
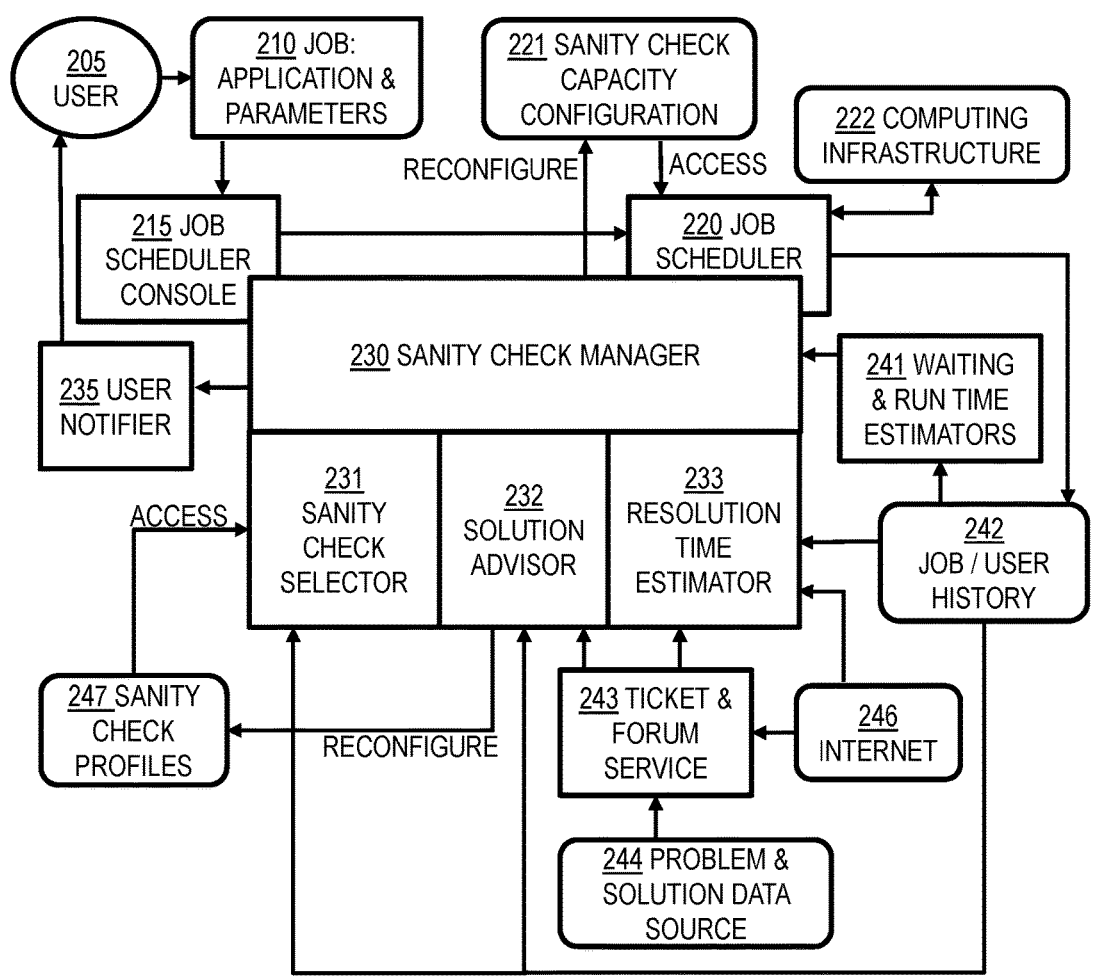
FIG. 2 is a block diagram depicting aspects of an illustrative embodiment of the invention.

FIG. 2 is a block diagram depicting aspects of an illustrative embodiment of the invention. A user 205 submits a job 210, specifying an application with a set of input parameters, to job scheduler console 215, e.g., in a manner similar to step 120 discussed above with reference to FIG. 1. As discussed above, these parameters may comprise, for example, specification(s) of how to run an application, as well as specification(s) of infrastructure resources (e.g., network, processor, memory, and storage) which impact job performance.

Job scheduler console 215 is a component that serves as an interface between user 205 and job scheduler 220. Thus, job scheduler console 215 is the component that receives user requests to run jobs and provides information to the user about the status of her jobs. Job scheduler 220 is a component that schedules jobs to run on the computing infrastructure 222, e.g., in a manner similar to step 130 discussed above with reference to FIG. 1. Thus, job scheduler 220 may place job 210 in a queue to await execution on the computing infrastructure 222.

The computing infrastructure 222 represents a set of computing resources able to run software programs, such as job 215, e.g., in a manner similar to that discussed above with reference to step 170 in FIG. 1. Computing infrastructure 222 may comprise one or more computers, each comprising at least one processor and memory, connected to one or more networks, as discussed below with reference to FIG. 6. For example, computing infrastructure 222 may comprise one or more nodes of an HPC cluster, including resources such as processor(s), memory, storage, and/or network(s). Job/user history 242 is updated by job scheduler 220 in order to record historical information about jobs executed and the owner of each job. Accordingly, the resolution time of problems identified by the sanity check jobs is recorded in job/user history 242.

Sanity check manager 230 is a component that manages sanity check jobs. Sanity check manager 230 may include and/or be coupled to sanity check selector 231, solution advisor 232, and/or resolution time estimator 233. Sanity check selector 231 is a component that determines sanity check strategies: e.g., how and which sanity checks should be executed. Thus, sanity check selector 231 may determine, for example, whether to use heavy or light sanity checks for a particular job, e.g., in a manner similar to step 140 discussed above with reference to FIG. 1. By way of example, sanity check selector 231 may determine whether to check software input dependencies, check library dependencies, and/or check hardware dependencies. Sanity check selector 231 may access (read from) strategy check profiles 247, which contains records of sanity checks. Sanity check selector 231 may also read from job/user history 242 to determine user profile and/or job characteristics which may be used to determine a sanity check level, as discussed above, such as the experience and/or expertise of a user, or whether an application is new.

Solution advisor 232 provides advice on how to solve problems detected by sanity check jobs. For example, solution advisor 232 may determine one or more possible solutions to a problem detected by the sanity check job(s) chosen by sanity check selector 231. Solution advisor 232 may reconfigure (write to) strategy check profiles 247, which contains records of sanity checks. Resolution time estimator 233 may determine an estimated job problem resolution time, e.g., an estimation on how long a problem will take to be solved. Solution advisor 232 and resolution time estimator 233 may operate, e.g., in a manner similar to step 150 discussed above with reference to FIG. 1.

Both solution advisor 232 and resolution time estimator 233 may obtain data from ticket and forum service 243, which collects information about problems and solutions. Ticket and forum service 243, in turn, may collect data from the Internet 246 and/or problem and solution data source 244, which could be, for example, a private forum. As discussed above with reference to step 150 in FIG. 1, such information may be used both by solution advisor 232 to provide one or more solutions and by resolution time estimator 233 to determine an estimated job problem resolution time (e.g., corresponding to each solution provided by solution advisor 233).

Solution advisor 232 and resolution time estimator 233 may also obtain data from job/user history 242, as information about job updates can help determine the resolution time. Job/user history 242 may also be accessed by waiting and run time estimators 241, which estimate the waiting and run times for each job, including both user jobs (e.g., 210 and/or received in step 120 of FIG. 1) and sanity check jobs (e.g., specified by sanity check selector 231 and/or executed in step 140 of FIG. 1). As discussed above, the estimated wait time for user job 210 may be based at least in part on the estimated run times for other jobs enqueued ahead of user job 210.

Sanity check manager 230 is coupled to user notifier 235, which provides information about failed sanity checks, e.g., in a manner similar to step 160 discussed above with reference to FIG. 1. Based on data from resolution time estimator 233 and waiting and run time estimators 241, sanity check manager 230 and/or job scheduler 220 may reschedule job 210, e.g., in a manner similar to that discussed above with reference to step 160 in FIG. 1.

Job scheduler 220 is also operative to access (e.g., read from) sanity check capacity configuration 221, which is a database used to configure the computing resources available for and/or assigned to sanity check jobs. Sanity check manager 230 is also operative to reconfigure (e.g., write to) sanity check capacity configuration 221, thereby allowing for the amount of infrastructure resources made available for and/or allocated to the sanity checks to be dynamically adapted based on, for example, the failure rate of job executions and/or the impact of job failure on system performance metrics (e.g., response time or resource utilization), as discussed above.

Figure 3:
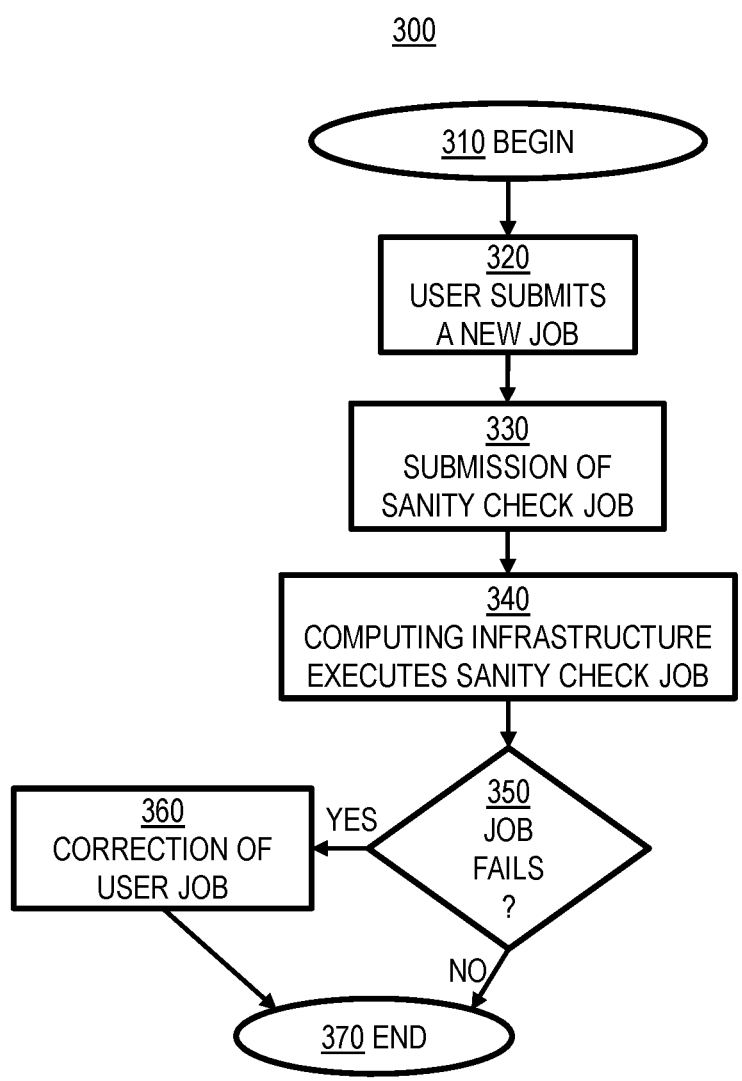
FIG. 3 is a combined block/flow diagram depicting aspects of an illustrative embodiment of the invention.

FIG. 3 is a combined block/flow diagram depicting aspects of an illustrative embodiment of the invention. Method 300 begins 310 with the user submitting a new job 320, which may correspond generally to steps 120 and/or 130 in FIG. 1 and/or to elements 205, 210, and/or 215 in FIG. 2. Submission of sanity check job 330 will be further discussed below with reference to FIG. 4. In step 340, computing infrastructure (e.g., 225 in FIG. 2) executes at least one sanity check job. Step 350 determines whether the sanity check executed in step 340 has indicated that the user job 210 would fail if executed. Steps 330, 340 and 350 collectively may correspond generally to step 140 in FIG. 1. If the sanity check has not failed, indicating that the user job 210 would successfully execute, then method 300 ends in step 370, which may correspond generally to steps 170 and 180 in FIG. 1. If the sanity check has failed, indicating that the user job 210 would not successfully execute, then method 300 proceeds to step 360, correction of user job, which corresponds generally to steps 150 and 160 in FIG. 1, and which will be further discussed below with reference to FIG. 5.

Figure 4:
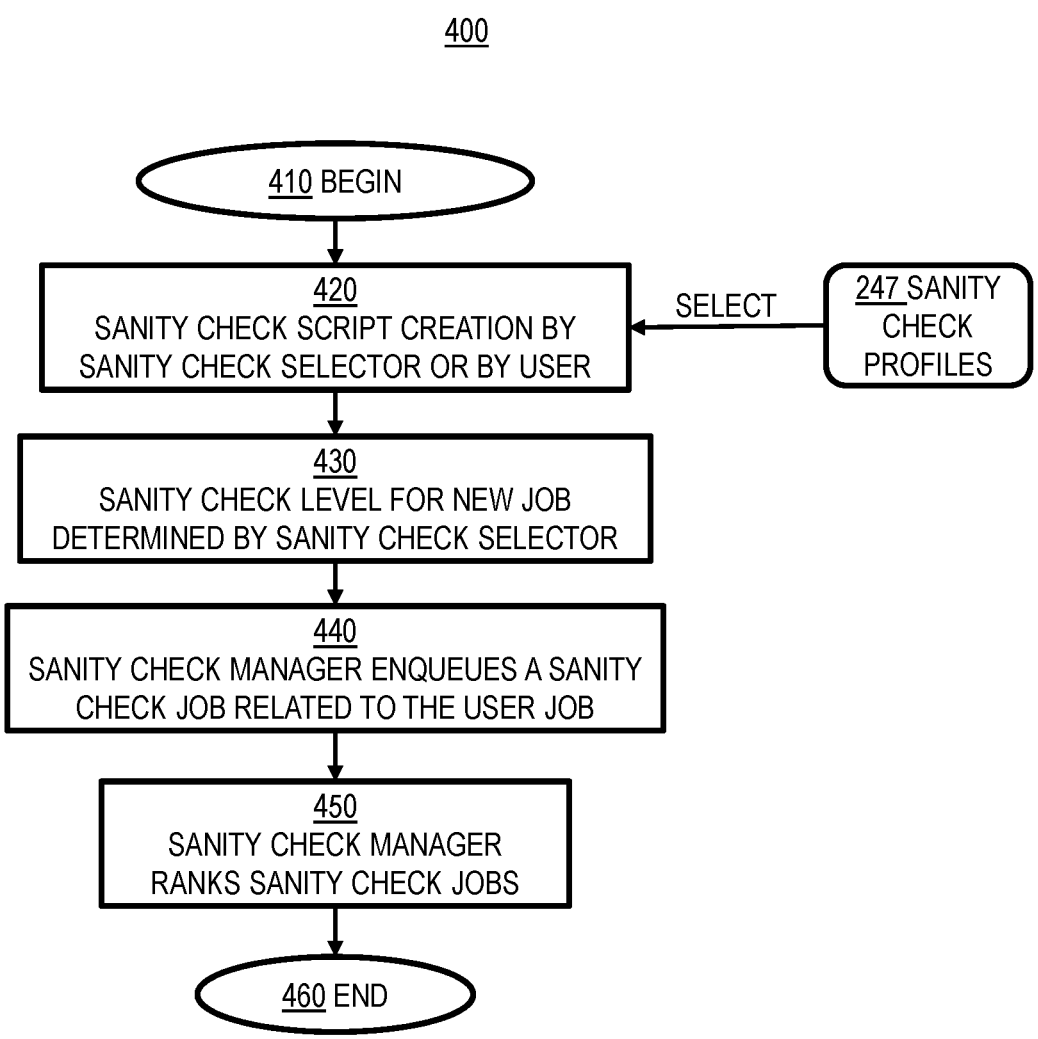
FIG. 4 is a combined block/flow diagram depicting submission of sanity check jobs in accordance with an illustrative embodiment of the invention.

FIG. 4 is a combined block/flow diagram depicting submission of sanity check jobs in accordance with an illustrative embodiment of the invention. Method 400 may represent, for example, step 330 in FIG. 3. Method 400 begins 410 (e.g., after step 320 in FIG. 3) with sanity check script creation 420, which may be performed either by sanity check selector 231 or user 205 in FIG. 2. In step 420, sanity check selector 231 may access sanity check profiles 247 to generate a sanity check script, and/or the user 205 can create a customized sanity check script. For example, user 205 can customize a sanity check script generated by sanity check selector 231 using sanity check profiles 247.

In step 430, the sanity check level (e.g., light or heavy) for the new job is determined by sanity check selector 231. As discussed above with reference to step 140 in FIG. 1, the sanity check level may be automatically selected based at least in part on job characteristics and/or user profile. Additionally or alternatively, the sanity check level may be automatically selected based at least in part on infrastructure resources available for and/or allocated to sanity checks. In step 440, sanity check manager 230 enqueues a sanity check job related to the user job 210.

In step 450, sanity check manager 230 ranks the sanity check jobs. The rank may be determined based at least in part on one or more of the following characteristics: the user profile, the predicted waiting/running time of the sanity check job, and the predicted waiting/running time of the user job. For example, the system may have low confidence in new users, therefore, their sanity check job executes first in comparison to experienced users. Additionally or alternately, if a user's job is predicted to have a large waiting time, then her sanity check job can be prioritized to allow that user to fix her job's problems while her job is waiting. The rank policy is defined by the system administrator and can use the aforementioned job and/or user characteristics to compose a single rank index. Method 400 in FIG. 4 ends in step 460, after which method 300 in FIG. 3 may proceed to step 340.

Figure 5:
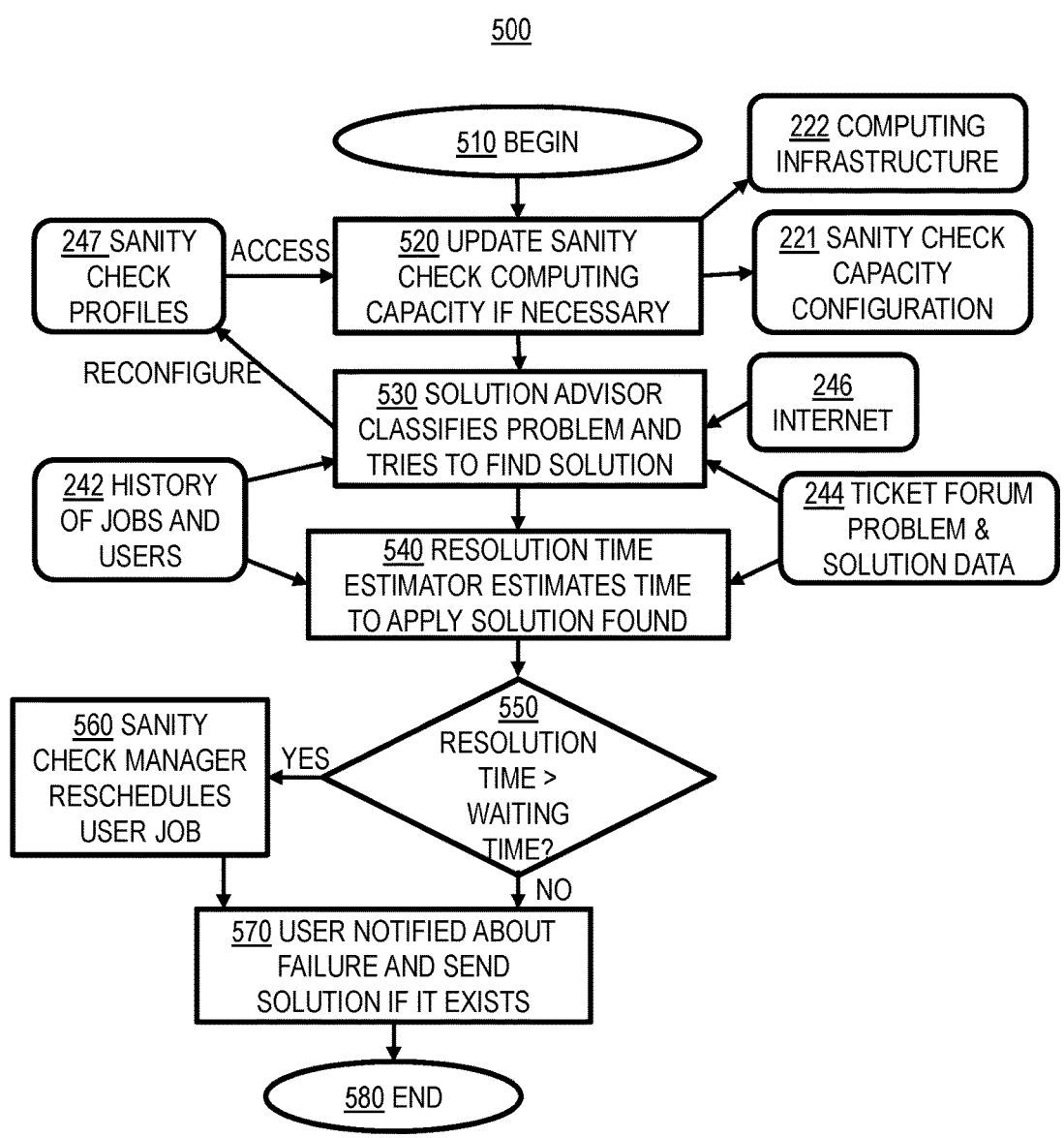
FIG. 5 is a combined block/flow diagram depicting correction of user jobs in accordance with an illustrative embodiment of the invention.

FIG. 5 is a combined block/flow diagram depicting correction of user jobs in accordance with an illustrative embodiment of the invention. Method 500 may represent, for example, step 360 in FIG. 3. Method 500 begins 510 (e.g., after step 350 in FIG. 3 detected a failed test) with updating the sanity check computing capacity 520 (e.g., the amount of infrastructure resources made available for and/or allocated to the sanity checks), if necessary. As previously discussed with reference to FIG. 1, the amount of infrastructure resources made available for and/or allocated to the sanity checks may be dynamically adapted based on, for example, the failure rate of job executions and/or the impact of job failure on system performance metrics (e.g., response time or resource utilization). For example, step 520 may involve verifying the sanity check level being selected (e.g., by accessing sanity check profiles 247) and, based on that, determining the amount of infrastructure resources required for sanity checking. Thus, step 520 may involve sanity check manager 230 reconfiguring sanity check capacity configuration 221, which is then accessed by job scheduler 220, as discussed above with reference to FIG. 2. Step 520 may also involve reconfiguring computer infrastructure 222, e.g., by modifying which infrastructure resources are made available for and/or allocated to the sanity checks.

In step 530, solution advisor 232 classifies the problem and tries to find a solution. As discussed above with reference to FIG. 1, machine learning techniques may be applied to historical data in order to classify problems into different categories so as to assist in finding an appropriate solution. Thus, as discussed above with reference to FIG. 2, solution advisor 232 may utilize, for example, job/user history 242, ticket and forum service 243, and/or Internet 246. Moreover, as previously noted, solution advisor 232 may find a plurality of possible solutions. Solution advisor 232 also updates (e.g., reconfigures) sanity check profile 247.

In step 540, resolution time estimator 233 evaluates the time to apply the solution found in step 530. As discussed above with reference to FIG. 1, a regression may be performed on historical data in the category determined in step 530 in order to predict the time to fix problems in that category. Thus, as discussed above with reference to FIG. 2, resolution time estimator 232 may utilize, for example, job/user history 242 and/or ticket and forum service 243. As previously noted, when solution advisor 232 finds a plurality of possible solutions, there may be a plurality of estimated job problem resolution times corresponding to respective possible solutions. Steps 530 and 540 collectively may correspond generally to step 150 in FIG. 1.

Step 550 determines whether the job problem resolution time estimated in step 540 (e.g., for a solution found in step 530) exceeds the estimated job wait time. As discussed above with reference to FIG. 1, the estimated job wait time represents an estimate of the remaining time to solve the problem before the user job 210 begins execution. Optionally, a system administrator can specify an acceptable confidence level when comparing the estimated resolution time and waiting time. If step 550 determines that the estimated resolution time does not exceed the estimated waiting time, then the problem can be fixed while the user job 210 is waiting the queue, such that no rescheduling is necessary, and the method 500 proceeds directly to step 570, which is discussed below.

If step 550 determines that the estimated resolution time does not exceed the estimated waiting time, then the method 500 proceeds to step 560, in which sanity check manager 230 reschedules the user job 210. As discussed above with reference to FIG. 1, the user job 210 is rescheduled so that it waits in a queue for at least the time required to fix the problem, in an effort to avoid executing the user job 210 before the problem can be fixed (e.g., by user 205). Thus, the user job 210 is rescheduled so that the estimated job wait time exceeds the estimated job problem resolution time (and optionally an amount of padding specified by the system administrator). After step 560, the method 500 proceeds to step 570.

In step 570, the user 205 is notified (e.g., by user notifier 235) about the failure and sent a solution if it exists. Thus, the user 205 may select and/or implement one or more of the possible solutions discussed above with reference to step 530, or the user may determine and implement a solution on her own. Steps 550, 560, and 570 collectively may correspond generally to step 160 in FIG. 1. After step 570, the method 500 ends in step 580, which may correspond to step 370 in FIG. 3, and/or may correspond generally to steps 170 and/or 180 in FIG. 1.

One or more embodiments of the invention, or elements thereof, can be implemented, at least in part, in the form of an apparatus including a memory and at least one processor that is coupled to the memory and operative to perform exemplary method steps.

Figure 6:
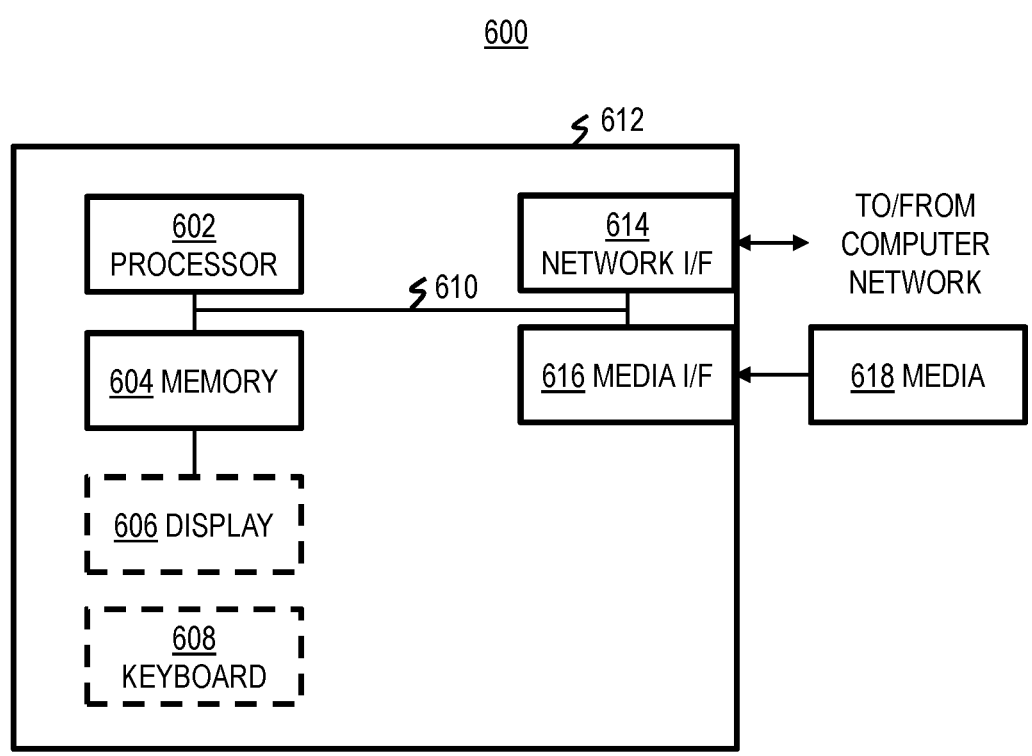
FIG. 6 shows a computer system that may be useful in implementing one or more aspects and/or elements of the invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 504 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for facilitating successful execution of a job submitted by a user, the method comprising:
    scheduling the job to be executed on at least a portion of a computing infrastructure;
    determining a level of sanity check to be performed on the job;
    performing the sanity check on the job while waiting for the job to be executed;
    when the sanity check shows that the job will not successfully execute, estimating at least one time required to repair the job such that the job will successfully execute; and
    finding whether the estimated time to repair the job exceeds an estimated time remaining before the job is scheduled to be executed; and
    when the estimated time to repair the job is found to exceed the estimated time remaining before the job is scheduled to be executed, rescheduling the job such that the estimated time remaining before the job is scheduled to be executed exceeds the estimated time to repair the job.

2. The method of claim 1, wherein estimating at least one time required to repair the job such that the job will successfully execute comprises:
    identifying one or more possible solutions for repairing the job; and
    estimating respective times required to repair the job for the one or more possible solutions.

3. The method of claim 1, determining the level of sanity check comprises determining whether to perform a light sanity check or a heavy sanity check.

4. The method of claim 3, wherein the light sanity check comprises verification of software dependencies or required libraries, and wherein the heavy sanity check comprises actual execution of the job for a period sufficient to detect premature failure.

5. The method of claim 1, wherein the level of sanity check is determined based at least in part on at least one of a characteristic of the job and a profile of the user.

6. The method of claim 1, wherein the level of sanity check changes as the user acquires at least one of experience and expertise.

7. The method of claim 1, wherein the level of sanity check is determined based at least in part on an amount of resources within the computing infrastructure available for or allocated to performing the sanity check.

8. The method of claim 1, further comprising the step of dynamically adapting an amount of resources within the computing infrastructure available for or allocated to performing the sanity check.

9. The method of claim 8, wherein the amount of resources within the computing infrastructure available for or allocated to performing the sanity check is initially specified by an administrator.

10. The method of claim 8, wherein the amount of resources within the computing infrastructure available for or allocated to performing the sanity check is adapted based at least in part on the level of sanity check determined for the job.

11. The method of claim 8, wherein the amount of resources within the computing infrastructure available for or allocated to performing the sanity check is adapted based at least in part on how failure of the job could impact one or more system performance metrics for the computing infrastructure.

12. The method of claim 1, wherein estimating at least one time required to repair the job comprises applying one or more machine learning techniques to historical data.

13. The method of claim 12, applying the one or more machine learning techniques comprises:
using the historical data to classify problems into a plurality of categories; and
performing a regression on data in a given category to predict a least one time required to fix problems in the given category.

14. The method of claim 1, wherein finding whether the estimated time to repair the job exceeds an estimated time remaining before the job is scheduled to be executed comprises finding whether the estimated time to repair the job exceeds an estimated time remaining before the job is scheduled to be executed with an acceptable confidence level specified by an administrator.

15. The method of claim 1, wherein rescheduling the job comprises rescheduling the job such that the estimated time remaining before the job is scheduled to be executed exceeds the estimated time to repair the job by at least a padding amount specified by an administrator.

16. The method of claim 1, wherein the sanity check to be performed on the job is one of a plurality of sanity checks comprising at least another sanity check to be performed on at least another job, and wherein performing the sanity check on the job comprises determining when within the plurality of sanity checks to perform the sanity check for the job.

17. The method of claim 16, wherein when within the plurality of sanity checks to perform the sanity check for the job is based at least in part on one or more of: a profile of the user, a predicted waiting or running time of the sanity check, and a predicting waiting or running time of the job.

18. The method of claim 17, wherein a safety check for a job submitted by a novice user is performed prior to the safety check for a job submitted by an expert user.

19. An apparatus, comprising:
a memory; and
at least one processor coupled to the memory, the processor being operative:
to schedule a job submitted by a user to be executed on at least a portion of a computing infrastructure;
to determine a level of sanity check to be performed on the job;
to perform the sanity check on the job while waiting for the job to be executed;
when the sanity check shows that the job will not successfully execute, estimating at least one time required to repair the job such that the job will successfully execute; and
to find whether the estimated time to repair the job exceeds an estimated time remaining before the job is scheduled to be executed; and
when the estimated time to repair the job is found to exceed the estimated time remaining before the job is scheduled to be executed, to reschedule the job such that the estimated time remaining before the job is scheduled to be executed exceeds the estimated time to repair the job.

20. A computer program product comprising a non-transitory machine-readable storage medium having machine-readable program code embodied therewith, said machine-readable program code comprising machine-readable program code configured:
to schedule a job submitted by a user to be executed on at least a portion of a computing infrastructure;
to determine a level of sanity check to be performed on the job;
to perform the sanity check on the job while waiting for the job to be executed;
when the sanity check shows that the job will not successfully execute, to estimate at least one time required to repair the job such that the job will successfully execute; and
to find whether the estimated time to repair the job exceeds an estimated time remaining before the job is scheduled to be executed; and
when the estimated time to repair the job is found to exceed the estimated time remaining before the job is scheduled to be executed, to reschedule the job such that the estimated time remaining before the job is scheduled to be executed exceeds the estimated time to repair the job.

* * * * *